(12) United States Patent
McBride et al.

(10) Patent No.: US 10,393,269 B2
(45) Date of Patent: Aug. 27, 2019

(54) RADIALLY DISPLACEABLE SEAL ASSEMBLY FOR A SHAFT

(71) Applicant: Aktiebolaget SKF, Göteborg (SE)

(72) Inventors: Tadd McBride, Riverton, UT (US); Josh Anderson, Stansbury Park, UT (US)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/399,442

(22) Filed: Jan. 5, 2017

(65) Prior Publication Data

US 2018/0187783 A1    Jul. 5, 2018

(51) Int. Cl.
*F16J 15/32*     (2016.01)
*F16J 15/3276*   (2016.01)
*F16J 15/3216*   (2016.01)
*F16J 15/3224*   (2016.01)

(52) U.S. Cl.
CPC ....... *F16J 15/3276* (2013.01); *F16J 15/3216* (2013.01); *F16J 15/3224* (2013.01)

(58) Field of Classification Search
CPC .. F16J 15/3264; F16J 15/3268; F16J 15/3272; F16J 15/3276; F16J 15/326; F16J 15/3252; F16J 15/3248; F16J 15/3216; F16J 15/322; F16J 15/16
See application file for complete search history.

(56) References Cited

U.S. PATENT DOCUMENTS

| | | | | |
|---|---|---|---|---|
| 3,120,959 A | * | 2/1964 | Jensen | F16J 15/36 277/374 |
| 4,898,394 A | * | 2/1990 | Voitik | F16J 15/26 277/589 |
| 6,575,471 B1 | * | 6/2003 | Grosspietsch | F16J 15/3236 277/436 |
| 6,736,403 B2 | * | 5/2004 | Kreutzer | F16J 15/3232 277/551 |

* cited by examiner

*Primary Examiner* — Kristina R Fulton
*Assistant Examiner* — L. Susmitha Koneru
(74) *Attorney, Agent, or Firm* — Mark Ussai; SKF USA Inc. Patent Dept.

(57) ABSTRACT

A seal assembly is for sealing a space between an inner surface of an outer member and an outer surface of a shaft within the outer member. The seal assembly includes an annular seal body having first and second axial ends, inner and outer circumferential surfaces, and a seal lip extending radially inwardly from the body and having an inner surface sealingly engageable with the shaft surface. The seal body is sized such that a clearance space is defined between the seal body outer surface and the outer member inner surface and a portion of the body inner surface is engageable with the shaft such that the body is radially displaceable within the clearance space when the shaft displaces radially. A retainer coupled with the outer member has a radial surface and a biasing member biases the seal body toward the retainer radial surface or a radial stop surface.

11 Claims, 7 Drawing Sheets

RADIALLY DISPLACEABLE SEAL ASSEMBLY FOR A SHAFT

The present invention relates to seals, and more particularly to seals for sealing an annular space between an angularly displaceable shaft and an outer member.

Seals for sealing the space between an inner shaft and an outer member, such as a boss, are known and typically include a generally annular body fixedly disposed within the outer member or boss and having an inner circumferential surface sealingly engageable with an outer circumferential surface of the shaft. In certain applications, such as linkage assemblies of lifter mechanisms used on construction vehicles (e.g., a front end loader), it is desirable to provide self-lubricating bearings to support the shaft within the boss, such as filament-wound bearings. However, such bearings tend to permit a certain amount of radial displacement of the shaft relative to the outer member/boss, and thus the seal, which could lead to ingress of contaminants into the joint.

SUMMARY OF THE INVENTION

In one aspect, the present invention is a seal assembly for sealing an annular space between an inner circumferential surface of an outer member, an outer circumferential surface of a shaft disposed within the outer member, and a radial stop surface extending generally between the inner and outer surfaces. The outer member has a bore with a centerline and the shaft being disposed at least partially within the bore and being angularly displaceable about or linearly displaceable along a central axis. The seal assembly comprises a generally annular seal body having first and second axial ends, inner and outer circumferential surfaces, and a seal lip extending generally radially inwardly from a remainder of the body. The seal lip has an inner circumferential surface sealingly engageable with the shaft outer surface. The seal body is sized such that a clearance space is defined between the seal body outer surface and the outer member inner surface. At least a portion of the body inner surface is engageable with the shaft such that the body is generally radially displaceable within the clearance space when the shaft displaces radially with respect to the bore centerline.

In another aspect, the present invention is again a seal assembly for sealing an annular space between an inner circumferential surface of an outer member, an outer circumferential surface of a shaft disposed within the outer member, and a radial stop surface extending generally between the inner and outer surfaces. The outer member has a bore with a centerline and the shaft being disposed at least partially within the bore and being angularly displaceable about or linearly displaceable along a central axis. The seal assembly comprises a generally annular seal body having first and second axial ends, inner and outer circumferential surfaces, and a seal lip extending generally radially inwardly from a remainder of the body. The seal lip has an inner circumferential surface sealingly engageable with the shaft outer surface. The seal body is sized such that a clearance space is defined between the seal body outer surface and the outer member inner surface. At least a portion of the body inner surface is engageable with the shaft such that the body is generally radially displaceable within the clearance space when the shaft displaces radially with respect to the bore centerline. Further, a retainer is fixedly disposed within the outer member bore and has a radial surface and a biasing member configured to bias the seal body generally axially toward the retainer radial surface. As such, the seal body first axial end is sealingly engaged with the retainer surface.

In a further aspect, the present invention is a mechanical assembly comprising an outer member having an inner circumferential surface and a bore with a centerline and a shaft disposed at least partially within the outer member bore, having an outer surface and being angularly displaceable about or linearly displaceable along a central axis. A seal assembly is for sealing an annular space between the inner surface of the outer member, the outer surface of a shaft disposed within the outer member, and a radial stop surface extending generally between the inner and outer surfaces. The seal assembly includes a generally annular seal body having first and second axial ends, inner and outer circumferential surfaces, and a seal lip extending generally radially inwardly from a remainder of the body. The seal lip has an inner circumferential surface sealingly engageable with the shaft outer surface. The seal body is sized such that a clearance space is defined between the seal body outer surface and the outer member inner surface. Further, at least a portion of the body inner surface is engageable with the shaft such that the body is generally radially displaceable within the clearance space when the shaft displaces radially with respect to the bore centerline. Furthermore, a retainer is fixedly disposed within the outer member bore and has a radial surface and a biasing member is configured to bias the seal body generally axially toward the retainer radial surface. As such, the seal body first axial end is sealingly engaged with the retainer surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 2, are each an axial cross-sectional view of the installed seal assembly, FIG. 2A showing a seal body centered about a bore centerline and FIG. 2B showing the seal body radially displaced from the bore centerline;

DETAILED DESCRIPTION OF THE INVENTION

Figure 1:
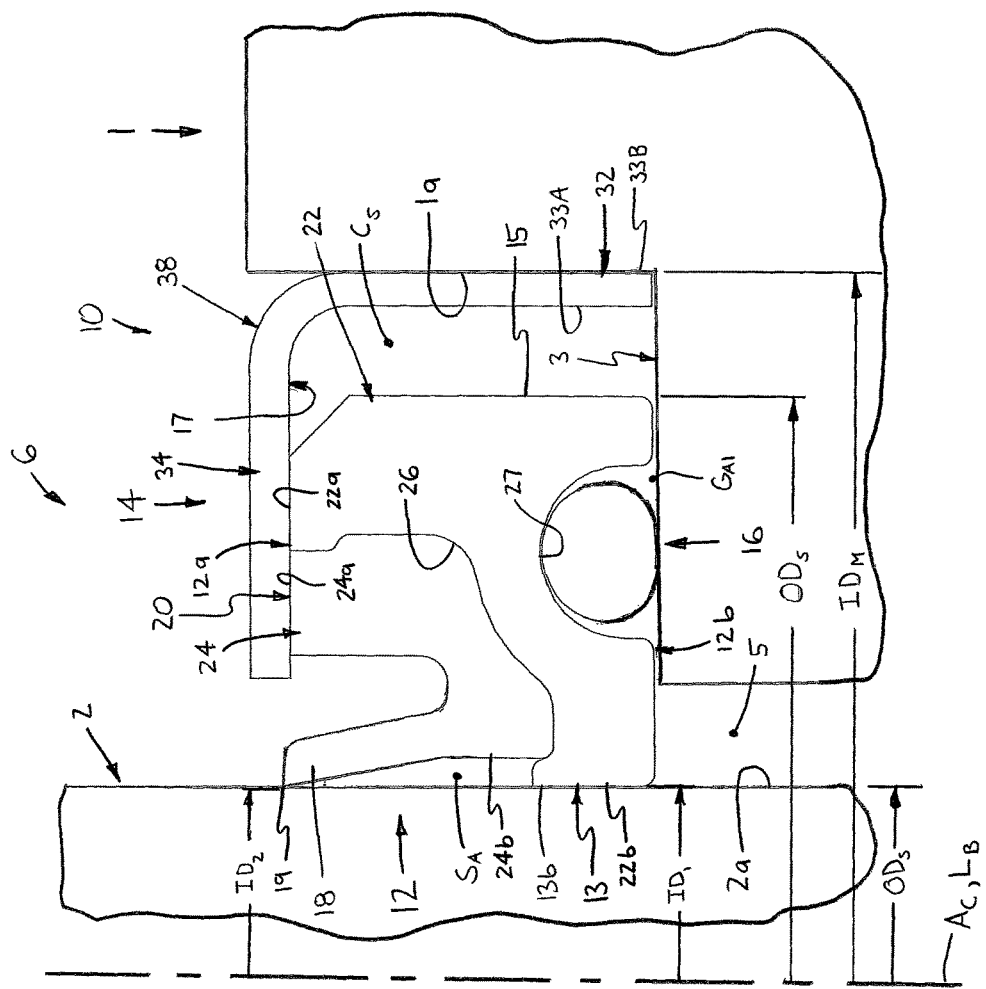
FIG. 1 is a broken-away, axial cross-sectional view of a seal assembly in accordance with the present invention, shown installed within an outer member and about a shaft.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween, indirect connections between members in which one or more other members are interposed therebetween, and operative connections between two or more members. The terminology includes the words specifically mentioned above, derivatives thereof, and words of similar import.

Referring now to the drawings in detail, wherein like numbers are used to indicate like elements throughout, there is shown in FIGS. 1-8 a seal assembly 10 for sealing a generally annular space $S_A$ between an inner circumferential surface 1a of an outer member 1 (preferably a boss of a joint assembly, as discussed below), an outer circumferential surface 2a of a pin or shaft 2 disposed within the outer member 1, and a radial stop surface 3 extending generally between the inner and outer surfaces 1a, 2a. The outer member 1 has a bore 5 with a centerline $L_B$, which may be at least partially defined by the inner surface 1a. The shaft 2 is at least partially disposed within the bore 5, is angularly displaceable about, or linearly displaceable along, a central axis $A_C$, and has an outer surface 2a. The seal assembly 10 basically comprises a seal body 12, and also preferably includes a retainer 14 and a biasing member 16. The seal body 12 has first and second axial ends 12a, 12b and inner and outer circumferential surfaces 13, 15, and a generally cantilever-like seal lip 18. The seal lip 18 extends generally radially inwardly, and preferably also generally axially, from a remainder of the body 12 and has an inner circumferential surface 19 sealingly engageable with the shaft outer surface 2a.

Figure 2A:
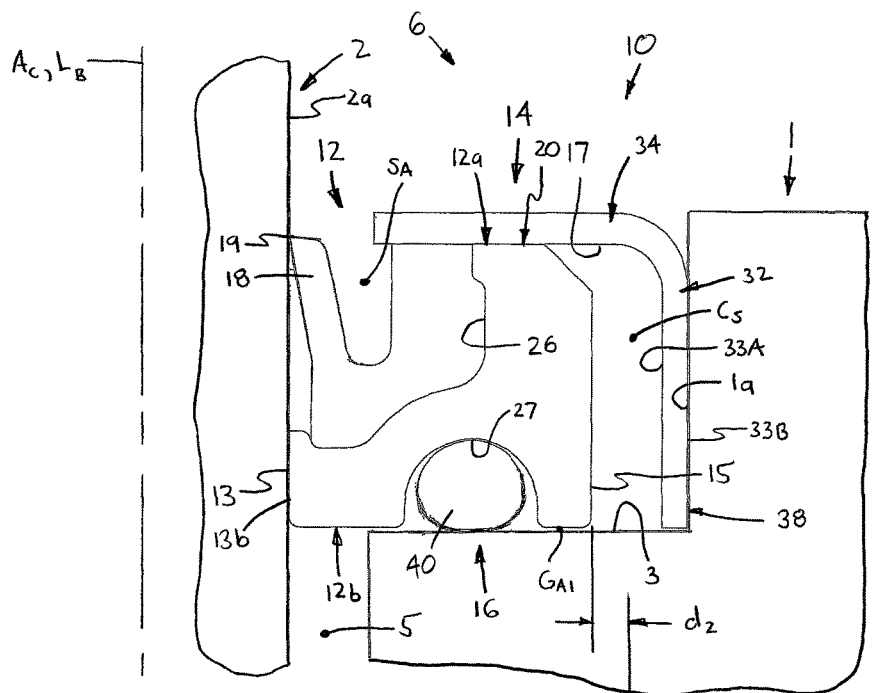
FIGS. 2A and 2B, collectively
Figure 2B:
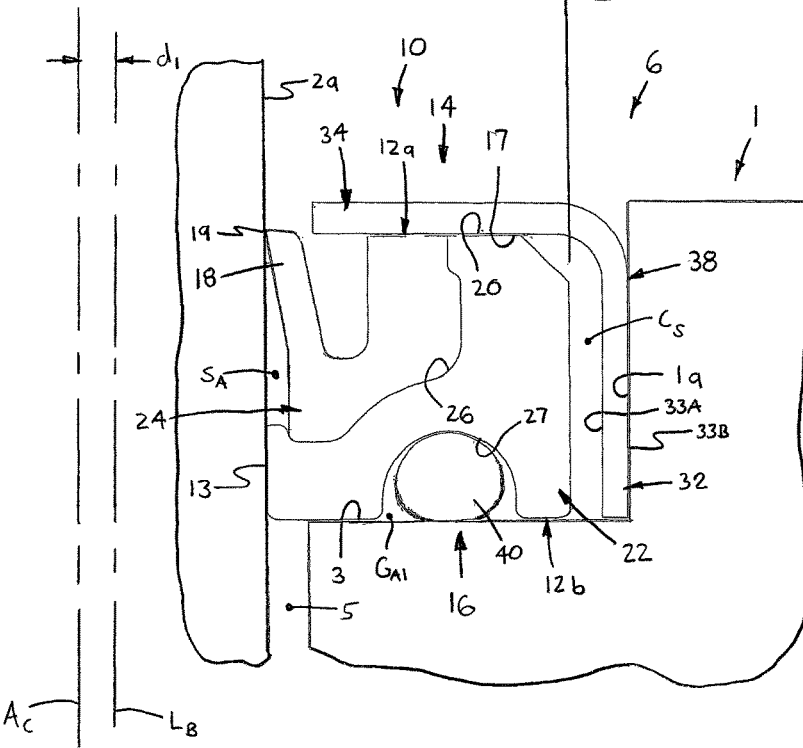
Figure 3:
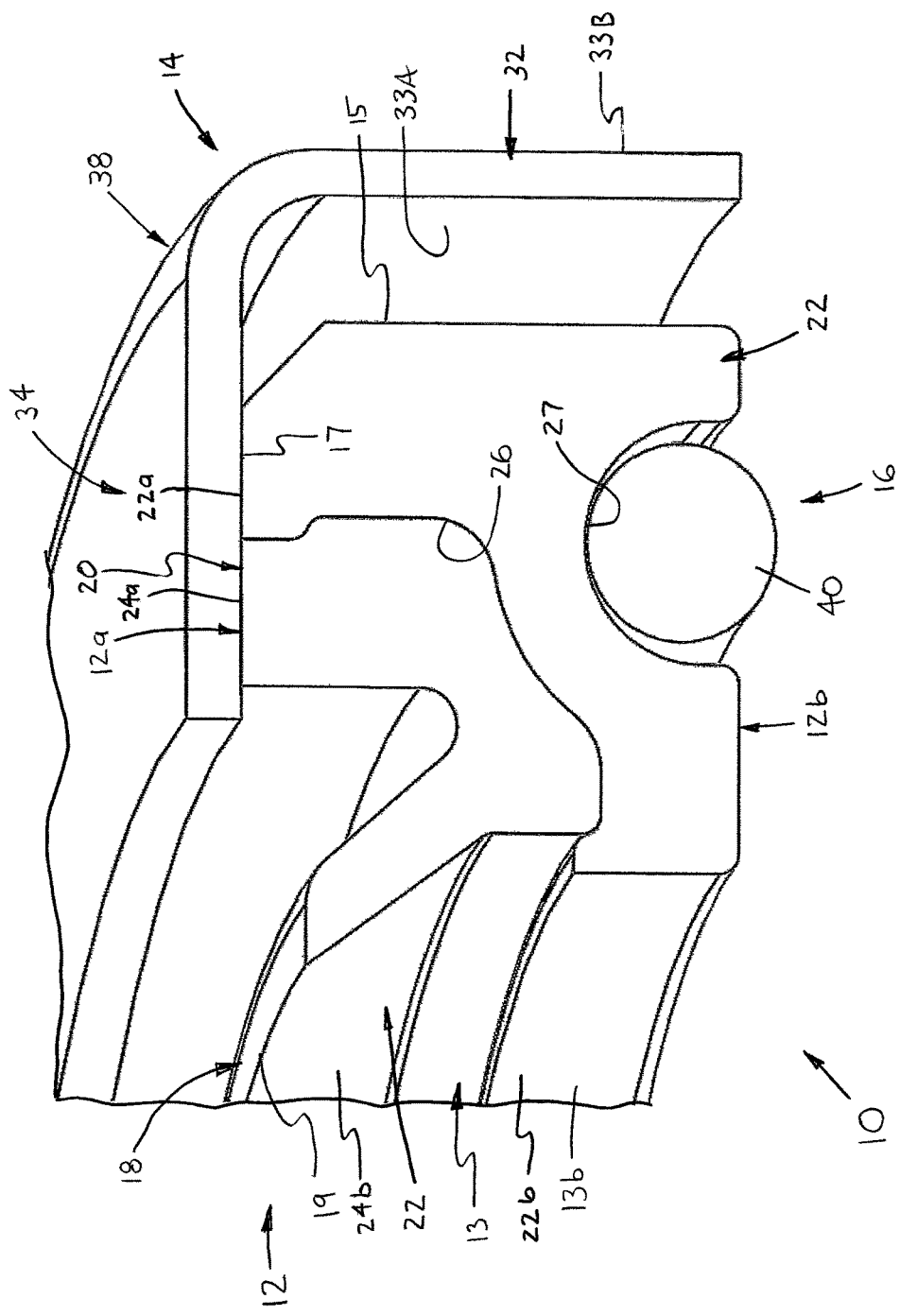
FIG. 3 is broken-away, perspective view in partial axial cross-section of the seal assembly, shown in an uninstalled state separate from a shaft and outer member.
Figure 4:
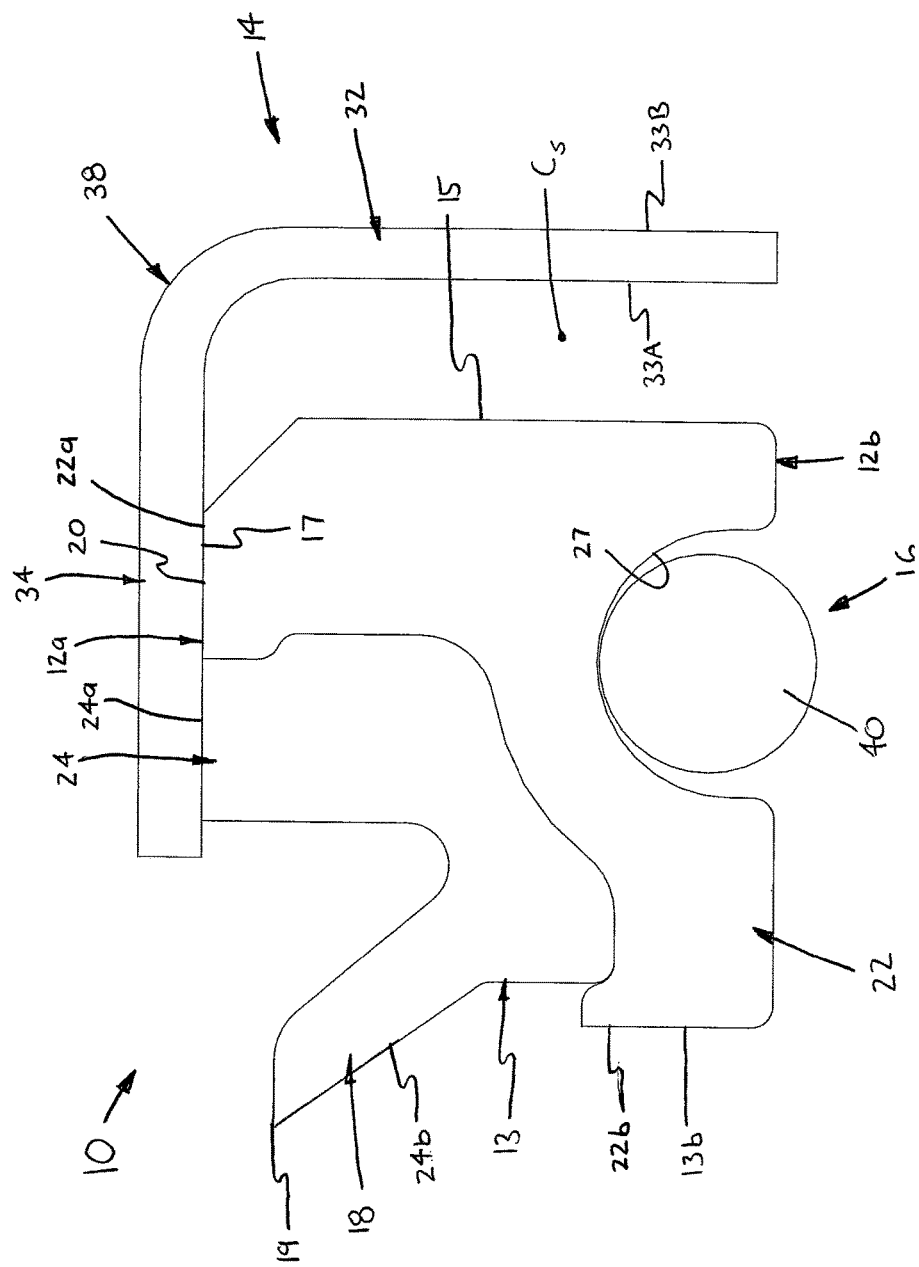
FIG. 4 is an axial cross-sectional view of the seal assembly shown in the uninstalled state.

The seal body 12 is sized and/or configured such that an outer clearance space $C_S$ is defined between the seal body outer surface 15 and the outer member inner surface 1a. In other words, the seal body outside diameter $OD_S$ at the outer surface 15 is sufficiently less than the inside diameter $ID_M$ of the member inner surface 1a to provide the clearance space $C_S$, as indicated in FIG. 1. Further, the body 12 is also sized and/or configured such that at least a portion 13 of the body inner surface 13 is engageable with the shaft 2, to thereby loosely couple the seal body 12 with the shaft 2. As such, the seal body 12 is generally radially displaceable within the clearance space $C_S$ when the shaft 2 displaces radially with respect to the bore centerline $L_B$, as shown in FIG. 2. Specifically, if the shaft 2 were displaced (or installed) by a radial distance $d_1$ with respect to the bore centerline $L_B$, the seal body 12 is capable of displacing an equal radial distance $d_2$ within the clearance space $C_S$ to accommodate such shaft displacement or offset. Thus, by having a radially displaceable seal body 12, the seal assembly 10 is able to compensate for radial displacement of the shaft 2, which may occur when supported by a wound-filament bushing or similar bearing, while ensuring sealing of the space $S_A$ between the shaft 2 and outer member 1.

Preferably, the retainer 14 is coupled with the outer member 3 and has a radial surface 17, and the biasing member 16 is configured to bias the seal body 12 generally axially toward the retainer radial surface 17 or toward the radial stop surface 3. More specifically, in a first, presently preferred construction shown in FIGS. 1-6, the biasing member 16 is disposed in an axial gap $G_{A1}$ between the radial stop surface 3 and the seal body second axial end 12b and biases the seal body 12 generally axially toward the retainer radial surface 17. As such, the body first axial end 12a is sealingly engaged with the retainer radial surface 17, to thereby seal the outer clearance space $C_S$, and the biasing member 16 is configured to substantially seal the axial gap $G_{A1}$. In an alternative construction depicted in FIGS. 7 and 8, the biasing member 16 is disposed in an axial gap $G_{A2}$ between the retainer radial surface 17 and the seal body first axial end 12a and biases the seal body 12 generally axially toward the radial stop surface 3. As such, the body second axial end 12b is sealingly engaged with the radial stop surface 3 to seal the outer clearance space $C_S$, and the biasing member 16 substantially seals the axial gap $G_{A2}$.

Referring particularly to FIG. 1, the seal body 12 is preferably sized such that the portion of the seal inner surface 13 engageable with the shaft outer surface 2a has a first inside diameter $ID_1$ and the seal lip 18 has a second inside diameter $ID_2$. The first inside diameter $ID_1$ is preferably greater than the second inside diameter $ID_2$ and lesser than a shaft outside diameter $OD_S$. As such, both the seal body inner surface portion 13 and the lip sealing surface 19 engage the shaft outer surface 2a with an interference fit, but with the seal lip 18 being more "tightly" sealed against the shaft 1. Further, the engagement of the body inner surface portion 13b with the shaft outer surface 2a enables the seal body 12 to "track" the radial movement of the shaft 1. Furthermore, the seal body 12 preferably has a generally semicircular annular groove 27 extending axially inwardly from the body second end 12b, the groove 27 being configured to receive a portion of the biasing member 16.

In the presently preferred construction shown in FIGS. 1-6, the seal body 12 is of two-piece construction and includes an outer body portion 22 formed of a first material and an inner body portion 24 disposed within the outer body portion 22 and formed of a second material. More specifically, the outer body portion 22 has a generally annular cavity 26 extending axially inwardly from the first axial end 12a and radially inwardly from the body inner circumferential surface 13. The outer body portion 22 provides the seal body outer surface 15, the second axial end 12b, a first section 22a of the first axial end 12 and a first section 22b of the body inner surface 13.

Further, the inner body portion 24 provides the seal lip 18, a second section 24a of the first axial end 12a and a second section 24b of the body inner surface 13. The first material forming the outer body 22 has a hardness greater than a hardness of the second material forming the inner body 24 and the second material has flexibility greater than the flexibility of the first material, the second material providing better sealing properties than the first material. Thus, the outer body 22 primarily functions to track the shaft 1 and carry the inner body portion 24, while the inner body portion 24 provides the primary sealing about the shaft 2. Preferably, the first material is Acetal and the second material is Urethane, but any other appropriate materials may alternatively be used.

Figure 7:
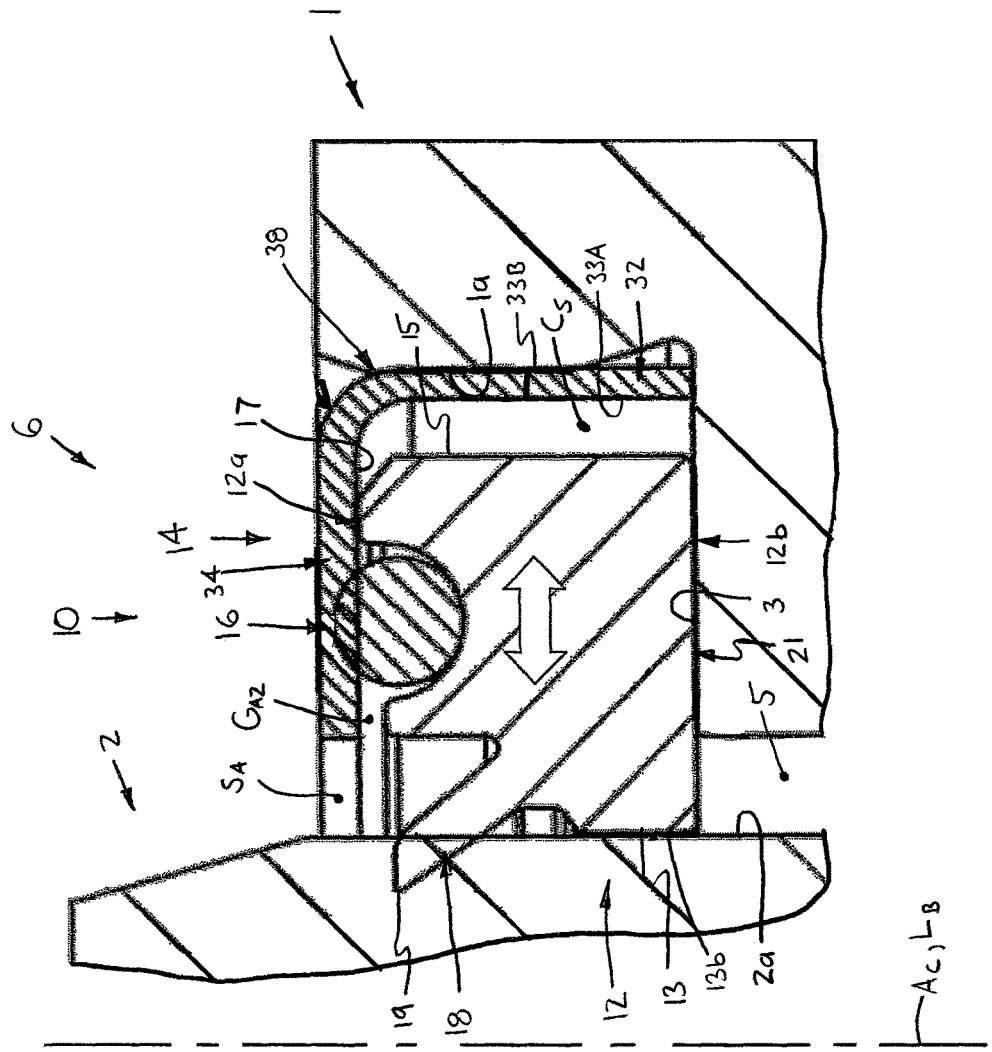
FIG. 7 is a broken-away, axial cross-sectional view of an alternative construction of the seal assembly in accordance with the present invention, shown installed within an outer member and about a shaft.
Figure 8:
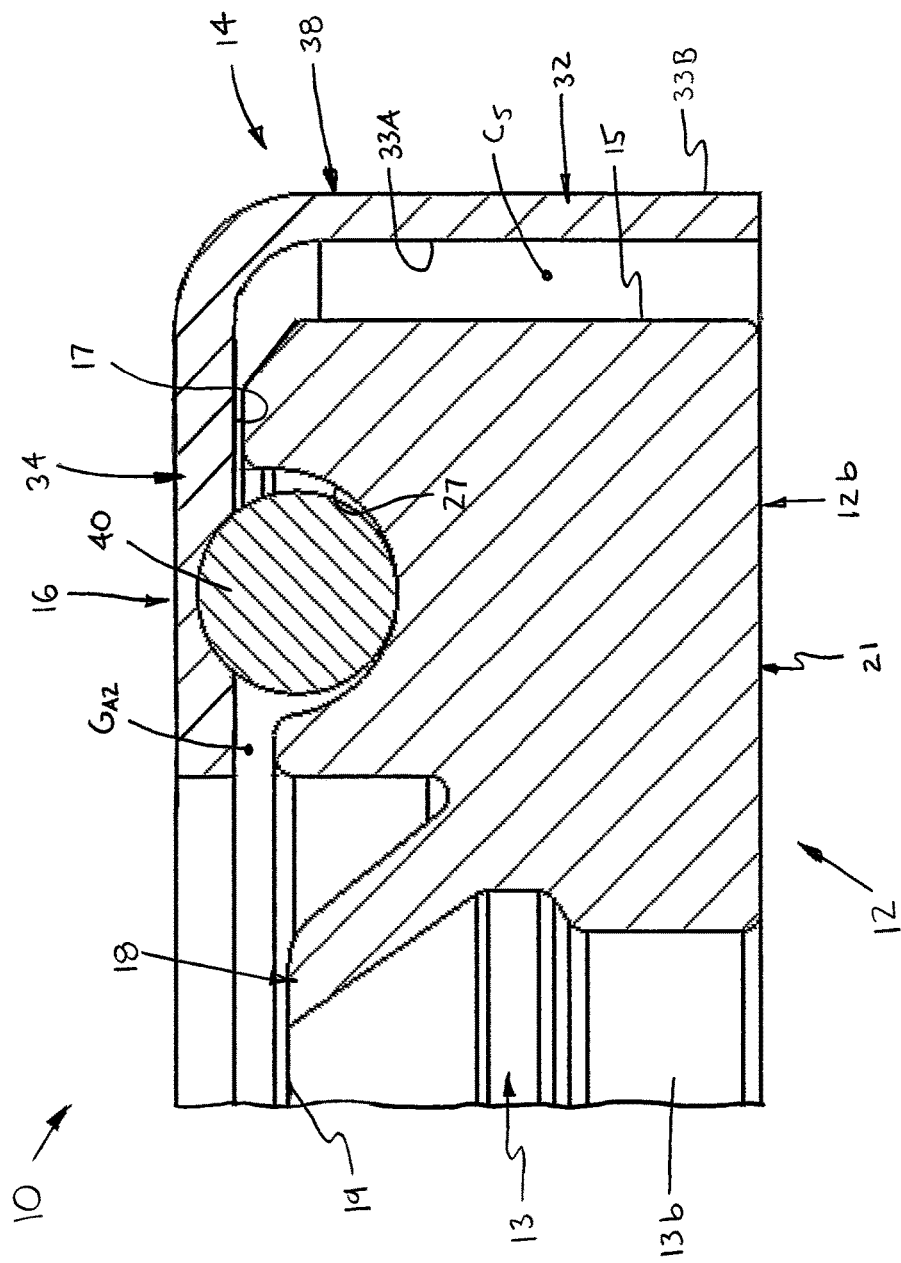
FIG. 8 is an axial cross-sectional view of the alternative construction seal assembly shown in the uninstalled state.

In the alternative construction shown in FIGS. 7 and 8, the seal body 12 is of one-piece construction and is preferably formed of urethane, but may be formed of any other appropriate material capable of functioning generally as described herein.

Referring again to FIGS. 1-8, the retainer 14 preferably includes an axial portion 32 coupled with the outer member 1 and a radial portion 34 extending generally radially inwardly from the axial portion 32 and providing the radial surface 17. The retainer axial portion 32 has inner and outer circumferential surfaces 33A, 33B, the outer surface 33B preferably being frictionally engageable with outer member inner surface 1a so as to fixedly couple the retainer 14 with the outer member 1. Also, the retainer axial portion inner surface 33A is sized such that the outer clearance space $C_S$ is at least partially defined between the retainer inner surface 33A and the seal body outer surface 15, thus reducing the volume of the clearance space $C_S$. However, the retainer 14 may be alternatively coupled with the outer member 1 by another mechanism, such as by frictional engagement between the retainer axial portion inner surface 33B and an outer surface section (not shown) of the outer member 1, such that the clearance space $C_S$ is the entire volume between the member inner surface 1a and the seal body outer surface 15.

Figure 5:
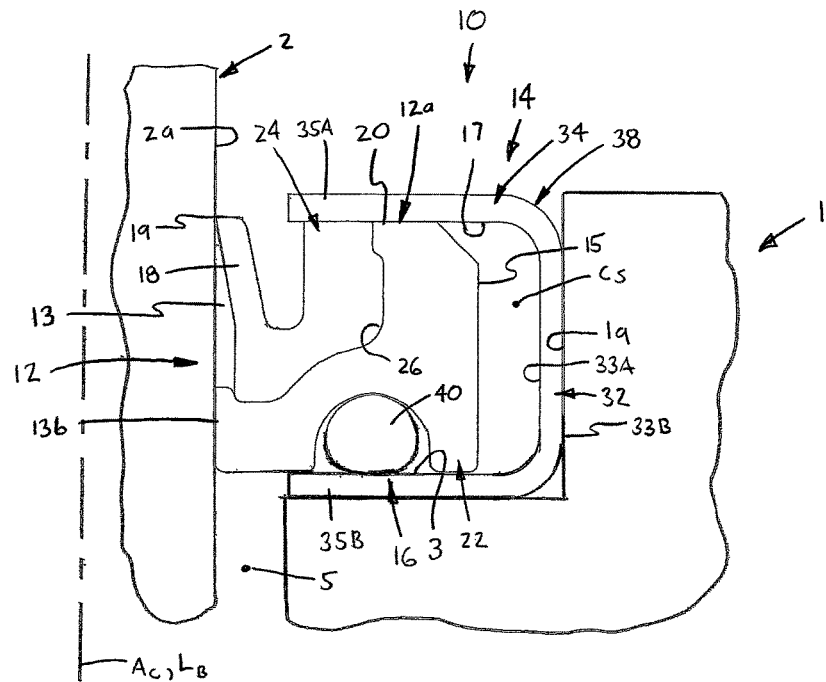
FIG. 5 is broken-away, axial cross-sectional view of the seal assembly shown with an alternative retainer construction.
Figure 6:
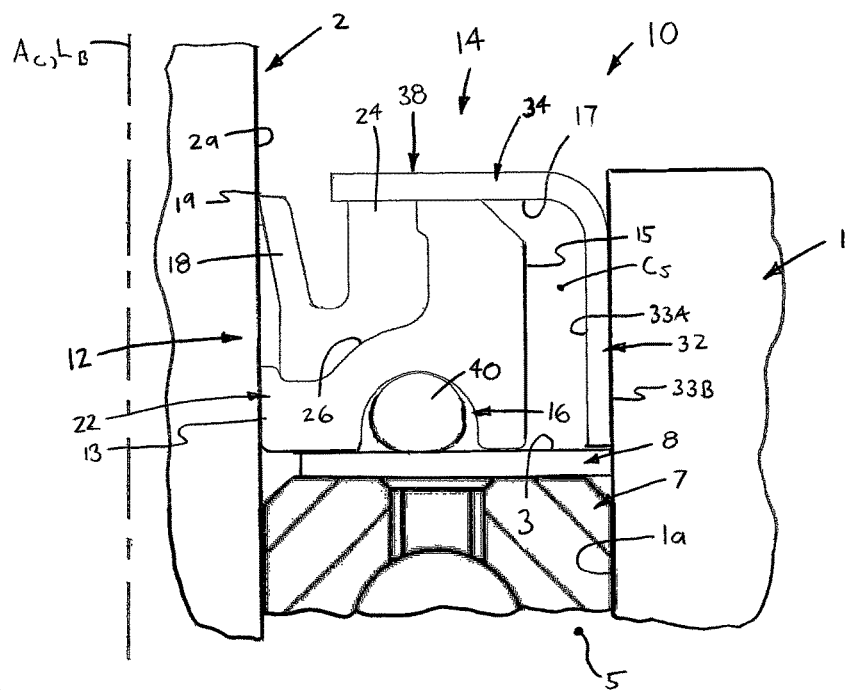
FIG. 6 is broken-away, axial cross-sectional view of the seal assembly, shown installed against a washer and a bearing.

In certain constructions as shown in FIG. 5, the retainer radial portion 34 is a first radial portion 35A and the retainer further includes a second radial portion 35B, the second radial portion 35B extending generally radially inwardly from the axial portion 32 and being spaced axially from the first radial portion 25A and from the seal body second end 12b. With this construction, the biasing member 16 is at least partially disposed between the seal body second end 12b and the retainer second radial portion 35B, such that the radial portion 35B provides the radial stop surface 3.

Further, the retainer 14 preferably includes a generally annular ring 38 having either generally L-shaped axial cross-sections (FIGS. 1-3 and 5-8) or generally U-shaped axial cross-sections (FIG. 4), such that the retainer axial and radial portions 32, 34 are integrally formed. However, the retainer 14 may be formed of separately connected or attached components as opposed to an integral ring, and/or may have any other appropriate shape. Furthermore, the ring 38 is preferably formed of a metallic material, but may be formed of any other appropriate material, such as for example, a polymeric material or a ceramic material.

Referring again to FIGS. 1-8, the biasing member 16 preferably includes a generally annular elastomeric ring 40 disposed between the second axial end 12b of the seal body 12 and a radial stop surface 3, which preferably has generally circular cross-sections in an "uncompressed state". In certain constructions as shown in FIGS. 1-6 and discussed above, the elastomeric ring 40 is preferably compressed between the seal body second end 12b and the stop surface 3, such that the compressed ring 40 exerts a biasing force on the seal body 12 that biases the seal body first end 12a, and specifically the radial sealing surface 20, into sealing engagement with the retainer radial surface 17. In other constructions as depicted in FIGS. 7 and 8, the elastomeric ring 40 is preferably compressed between the seal body first end 12b and the retainer radial surface 17, such that the compressed ring 40 exerts a biasing force on the seal body 12 that biases the seal body second end 12b, and specifically the radial sealing surface 21, into sealing engagement with the radial stop surface 3. Also, by being formed as a compressed elastomeric ring 40, the biasing member 16 is further configured to seal the generally axial gap $G_{A1}$ or $G_{A2}$, as discussed above. Thus, the biasing member 16 also functions as a supplemental or "back-up" seal, i.e., to the seal provided between the seal body radial surface 20 and the retainer surface 17 or body radial surface 21 and stop surface 3.

Referring to FIGS. 1-3 and 7, the stop surface 3 is preferably provided by a portion of the outer member 1 that extends inwardly from the inner surface 1a. As such, the seal assembly 10 is disposed in a counter-bore of the outer member 1. However, the stop surface 3 may alternatively be provided by the second radial section 35B of the retainer 14 (FIG. 5), or a bearing 7 or washer 8 (FIG. 6) disposed within the outer member bore 5.

In one preferred application, the seal assembly 10 is used with a mechanical assembly 6 within a joint of a linkage including a first link and at least one second link (structure not shown). In such an application, the outer member 1 is preferably a generally cylindrical boss coupled with the first link and the shaft 2 is coupled with the at least one second link. Most preferably, the at least one second link includes a pair of second links spaced apart along the shaft axis $A_C$, and the shaft 2 has opposing axial ends each coupled with a separate one of the pair of second links, with the boss being disposed between the pair of links. Further, the boss has opposing axial ends and two seal assemblies 10 are preferably utilized to each seal a separate one of the two boss ends. Further, the joint assembly preferably includes at least one and preferably two bearings that are each a wound-filament type of bearing, such that each bearing is "self-lubricating". As such bearings are capable of a certain amount of deflection or compression, the shaft 2 is moveable radially with respect to the outer member or boss 1. However, with the present seal assembly 10, the seal body 12 is movable within the clearance space $C_S$ while remaining in sealing engagement with both the shaft outer surface 2a and the retainer radial surface 17 or radial stop surface 3, and also preferably with the preferred elastomeric biasing member 16.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A seal assembly for sealing an annular space between an inner circumferential surface of an outer member, an outer circumferential surface of a shaft disposed within the outer member, and a radial stop surface extending generally between the inner and outer surfaces, the outer member having a bore with a centerline and the shaft being disposed at least partially within the bore and being angularly displaceable about or linearly displaceable along a central axis, the seal assembly comprising:

a generally annular seal body including an outer body portion and an inner body portion, the outer body portion being formed of a first material and having opposing first and second axial ends, inner and outer circumferential surfaces and a generally annular cavity, the outer body portion being sized such that a clearance space is defined between the outer circumferential surface of the outer body portion and the outer member inner surface and such that the inner circumferential surface of the outer body portion is engageable with the shaft to loosely couple the seal body with the shaft so that the seal body is nonrotatable about the shaft central axis and is generally radially displaceable within the clearance space when the shaft displaces radially with respect to the bore centerline, the inner body portion being formed of a second material and having a radially-inwardly extending seal lip having an inner circumferential surface sealingly engageable with the shaft, the inner body portion being disposed at least partially within the cavity of the outer body portion such that the outer body portion carries the inner body portion when the shaft displaces radially, the first material having a hardness greater than a hardness of the second material and the second material having flexibility greater than the flexibility of the first material;

a retainer coupled with the outer member and having a radial surface; and a biasing member disposed between the outer body second axial end and the radial stop surface and configured to bias the seal body generally axially toward the retainer radial surface such that the first axial end of the outer body portion is sealingly engaged with the retainer surface or disposed between the outer body first axial end and the retainer radial surface and configured to bias the seal body generally axially toward the radial stop surface such that the second axial end of the outer body portion is sealingly engaged with the radial stop surface.

2. The seal assembly as recited in claim 1 wherein:

the biasing member is disposed in an axial gap between the radial stop surface and the second axial end of the seal outer body portion, the biasing member biasing the seal body generally axially toward the retainer radial surface and configured to substantially seal the axial gap; or the biasing member is disposed in an axial gap between the retainer radial surface and the first axial end of the seal outer body portion, the biasing member biasing the seal body generally axially toward the radial stop surface and configured to substantially seal the axial gap.

3. The seal assembly as recited in claim 1 wherein the annular cavity of the seal outer body portion extends axially inwardly from the first axial end of the outer body portion and radially inwardly from the inner circumferential surface of the seal outer body portion, the seal inner body portion having an axial end sealingly engageable with the retainer radial surface.

4. The seal assembly as recited in claim 1 wherein the seal outer body portion has an annular groove extending axially inwardly from the second axial end of the outer body portion and the biasing member is an annular elastomeric ring disposed at least partially within the outer body portion groove and against the retainer stop surface.

5. The seal assembly as recited in claim 1 wherein the retainer includes an axial portion coupled with the outer member and a radial portion extending generally radially inwardly from the axial portion and providing the radial surface.

6. The seal assembly as recited in claim 5 wherein the retainer axial portion has inner and outer circumferential surfaces, the axial portion outer surface being frictionally engageable with outer member inner surface and the clearance space being at least partially defined between the retainer inner surface and the seal body outer surface.

7. The seal assembly as recited in claim 5 wherein the retainer radial portion is a first radial portion and the retainer further includes a second radial portion, the second radial portion extending generally radially inwardly from the axial portion and being spaced axially from the first radial portion and from the second axial end of the seal outer body portion, the biasing member being at least partially disposed between the seal outer body portion second axial end and the retainer second radial portion.

8. The seal assembly as recited in claim 1 wherein the biasing member includes a generally annular elastomeric ring having generally circular axial cross-sections.

9. The seal assembly as recited in claim 1 wherein the inner circumferential surface of the seal outer body portion has a first inside diameter and the seal lip of the seal inner body portion has a second inside diameter, the first inside diameter being greater than the second inside diameter and lesser than a shaft outside diameter such that each of the seal outer body inner surface and the lip sealing surface engages the shaft outer surface with an interference fit.

10. The seal assembly as recite in claim 1 wherein the first inner surface section of the outer body has an inside diameter lesser than an outside diameter of the shaft such that the outer body portion engages the shaft with an interference fit.

11. The seal assembly as recited in claim 1 wherein the stop surface is provided by one of a portion of the outer member, another radial portion of the retainer, a bearing member disposed within the outer member bore, and a washer disposed within the outer member bore.

* * * * *